W. H. MATTHEW.
DANGER SIGNAL.
APPLICATION FILED JULY 8, 1918
1,314,088.
Patented Aug. 26, 1919.
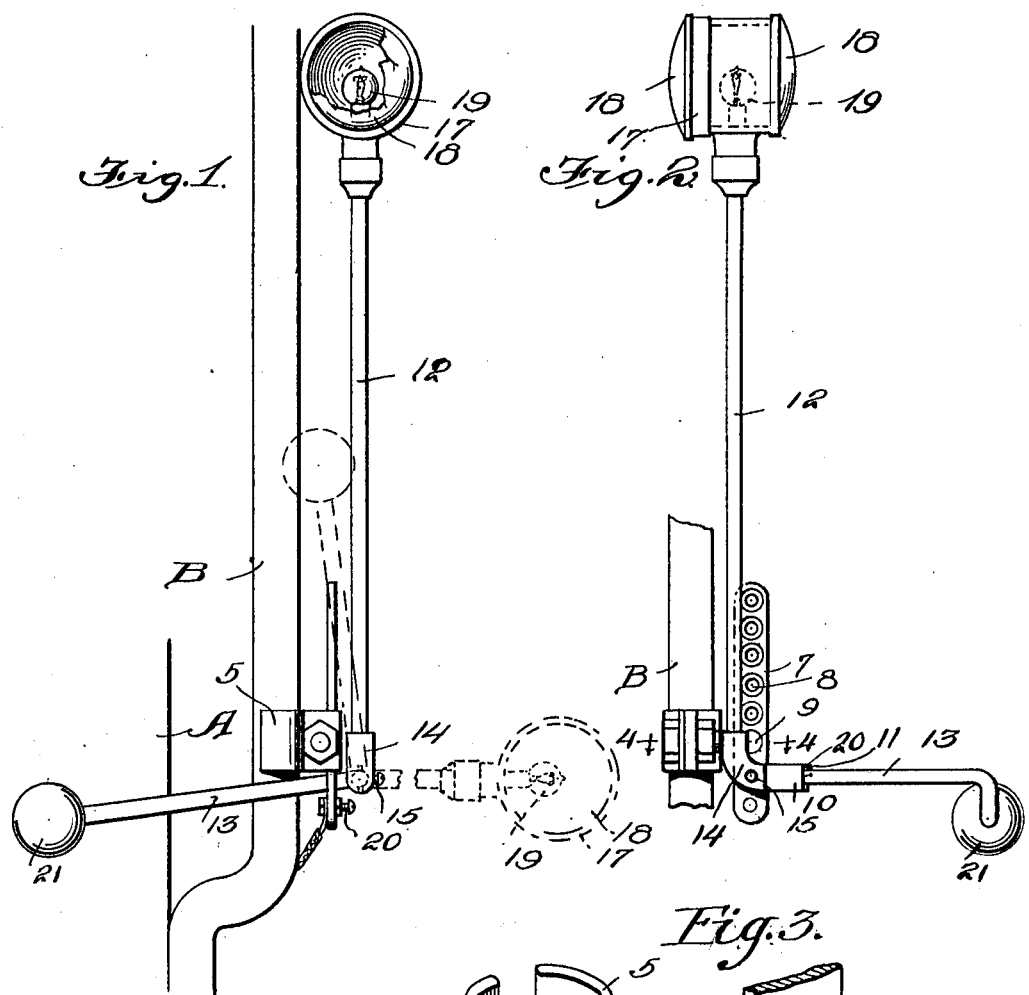
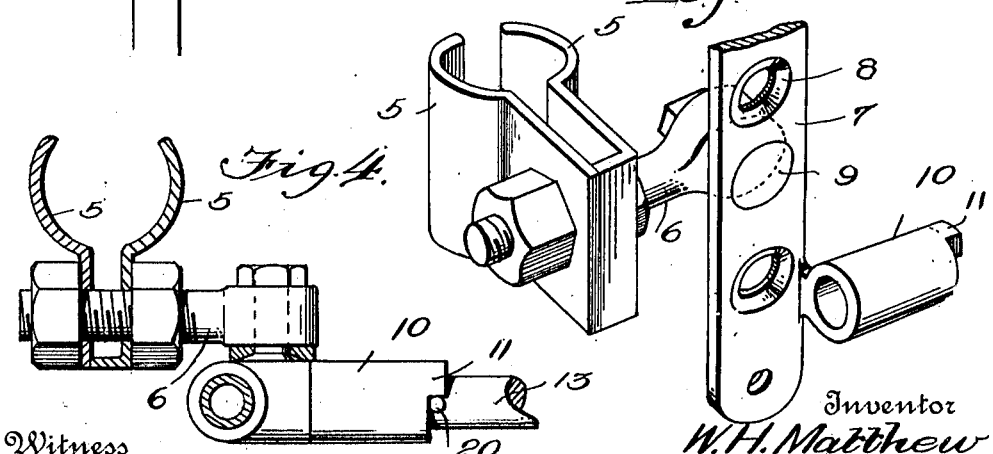

UNITED STATES PATENT OFFICE.

WILLIAM H. MATTHEW, OF ZANESVILLE, OHIO.

DANGER-SIGNAL.

1,314,088.   Specification of Letters Patent.   Patented Aug. 26, 1919.

Application filed July 8, 1918. Serial No. 243,747.

*To all whom it may concern:*

Be it known that I, WILLIAM H. MATTHEW, a citizen of the United States, residing at Zanesville, in the county of Muskingum, State of Ohio, have invented certain new and useful Improvements in Danger-Signals; and I do hereby declare the following to be a full, clear, and exact description of the invention, such as will enable others skilled in the art to which it appertains to make and use the same.

The invention relates to a signal and more particularly to the class of hand operated visible signals for use on automobiles or other vehicles.

The primary object of the invention is the provision of a signal of this character, wherein an illuminated head is supported on a swinging arm and adapted to be mounted on a vehicle, and is controllable by hand so as to be projected at times from one side of the vehicle, and in which position it will be visible from an approaching vehicle.

Another object of the invention is the provision of a signal of this character, including a bracket providing for attachment of the device to a vehicle and for its proper adjustment.

A further object of the invention is, the provision of a signal of this character, which is extremely simple in construction, readily and easily operated, and inexpensive to manufacture and install.

With these and other objects in view, the invention consists in the features of construction, combination and arrangement of parts as will be hereinafter fully described, illustrated in the accompanying drawing and pointed out in the claims hereunto appended.

In the accompanying drawing:

Figure 1, is a fragmentary front elevation of a portion of the body of an automobile and its top showing the signal constructed in accordance with the invention, applied, and in raised position, its signaling position being indicated in dotted lines.

Fig. 2, is a side elevation showing the signal in raised or nonsignaling position.

Fig. 3, is a fragmentary perspective view of the bracket detached from the automobile.

Fig. 4, is a sectional view on the line 4—4 of Fig. 2.

Similar reference characters indicate corresponding parts throughout the several views in the drawing.

Referring to the drawing in detail, A, designates a portion of the body of an automobile, and B, a portion of one of the bows of its top, which is of the ordinary well known construction and on the side member of the bow is clamped the present hand operated signal, hereinafter fully described.

The hand operated signal comprises, a pair of clamping jaws 5, in which is engaged an eye bolt 6 adjustably carrying a bracket comprising a vertical, flat elongated plate 7 having a longitudinal series of holes 8 for detachably and adjustably receiving a binding bolt 9, which is engaged in the eye of the eye bolt 6. A right angular sleeve 10 is integrally formed with the shank or plate 7 and projects rearwardly from the lower portion thereof, the sleeve being formed with an abutment shoulder 11, and in the sleeve is mounted for rocking movement a crank lever 13.

A tubular standard 12 joins the crank lever 13 through the medium of an elbow coupling 14, the coupling being formed with an opening 15 for receiving the current wires of a normally opened electric circuit, which are not shown, but which may pass through the standard 12 to a lamp 19 later described, the circuit being closed in any suitable manner. On the upper or outer free end of the standard 12 is a cylindrical lamp casing 16 constituting a head having removable front section 17 for access thereto and in this front section and in the back of the head are signal lenses or bull's eyes 18 for the projecting of light from the head.

Mounted in the head is the electric lamp 19 the socket for which may be connected with the current wires of the electric circuit and this lamp when illuminated will cause rays of light through the front and back of the head to be seen for some distance. The lever 13 is fitted with a stop pin 20 which through engagement with the shoulder 11 limits the swinging movement of the standard 12 when shifted to either signaling or nonsignaling position.

The crank lever 13 is formed with a weighted knob 21 at its free terminal which serves to hold the signal head against accidental swinging movement when either raised or lowered, the signal standard 12 being in a perpendicular position when in nonsignaling position and in horizontal position when signaling. The signal head is visible both forwardly and rearwardly of the automobile and is manually operated by the driver thereof.

What is claimed is:

1. A hand operated signal for vehicles comprising a clamp, a bolt engaged through the clamp for actuation of the jaws thereof, an eye carried by the bolt, a plate provided with a longitudinal series of openings, a bolt engaged in one of said openings and removably engaged in the eye, said bolt being engageable in any of the openings of the plate, a sleeve carried by the plate, a crank engaged in the sleeve for rocking movement, an arm carried by the crank, and a signal carried by the arm.

2. A hand operated signal for vehicles comprising attaching means including an eye, a vertical plate provided with a longitudinal series of openings, a bolt engaged in one of the openings and with the eye, said bolt being engageable in any of the openings, a lateral sleeve carried by the plate and having a stop shoulder, a crank engaged in the sleeve for rocking movement, a stop carried by the crank and engageable with the shoulder, an elbow coupling carried by the crank, an arm engaged in the elbow coupling, and a signal carried by the arm.

In testimony whereof, I affix my signature, in the presence of two witnesses.

WILLIAM H. MATTHEW.

Witnesses:
LEWIS C. CROOKS,
IRA D. WENDELL.

Copies of this patent may be obtained for five cents each, by addressing the "Commissioner of Patents, Washington, D. C."